Jan. 3, 1939.     H. J. ANDERSON     2,142,970
MECHANICAL VALVE
Filed May 11, 1936      2 Sheets-Sheet 1
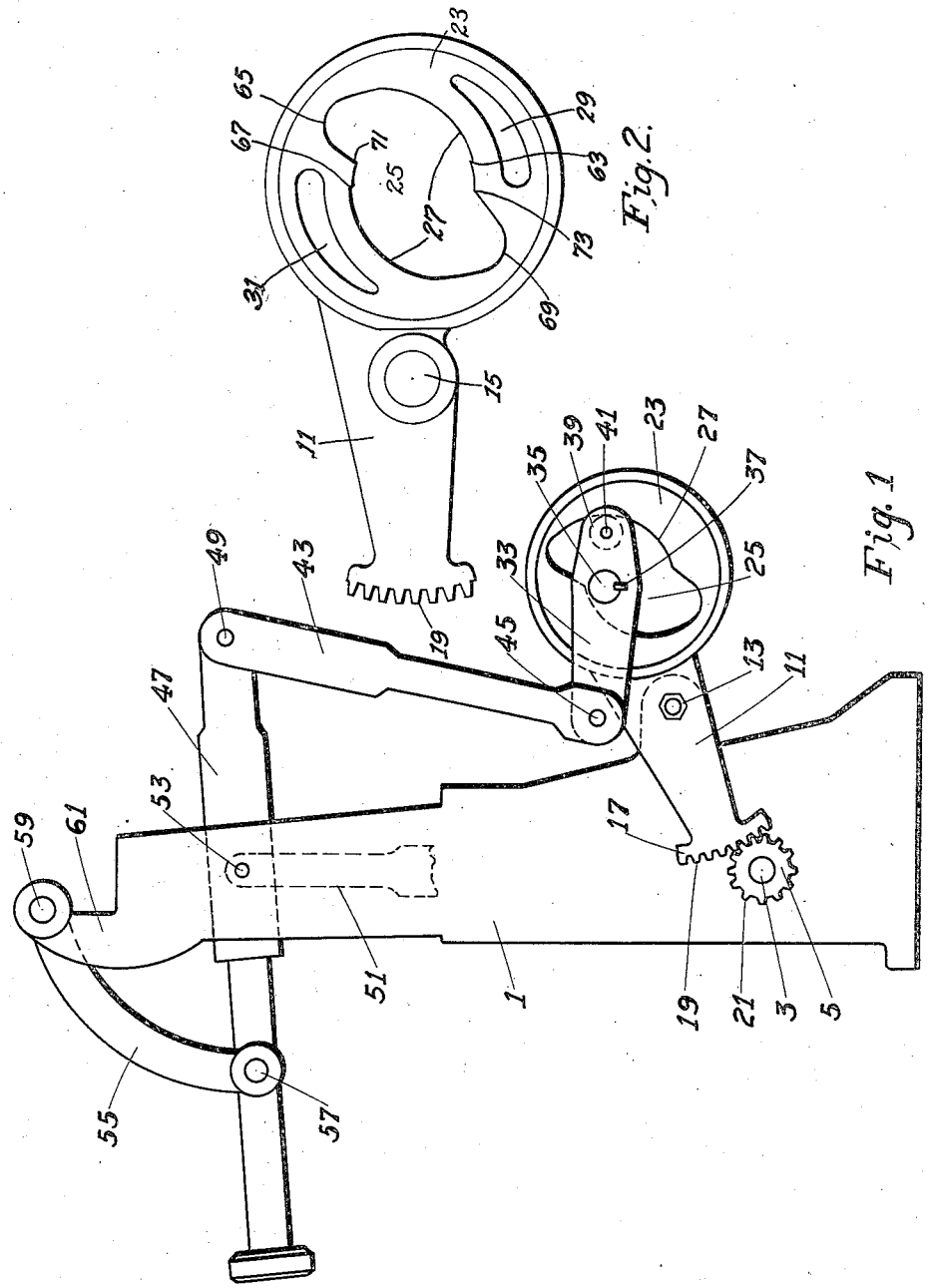
INVENTOR
Harry J. Anderson
BY Edward H. Lang
ATTORNEY Jan. 3, 1939.　　　　H. J. ANDERSON　　　　2,142,970
MECHANICAL VALVE Filed May 11, 1936　　　　2 Sheets-Sheet 2

INVENTOR
Harry J. Anderson
BY Edward H. Lang
ATTORNEY

Patented Jan. 3, 1939

2,142,970

UNITED STATES PATENT OFFICE 2,142,970

MECHANICAL VALVE

Harry J. Anderson, Chicago, Ill., assignor to Hills-McCanna Company, Chicago, Ill., a corporation of Illinois Application May 11, 1936, Serial No. 78,965

5 Claims. (Cl. 137—146)

This invention relates to mechanical valves and to the method of operating the same. More particularly, the invention is concerned with rotary type valves and means for operating such valves in conjunction with plunger type pumps.

When pumping free flow liquids it is necessary only to provide suitable check valve on the inlet and outlet to obtain satisfactory results. However, if an attempt is made to pump heavy, viscous liquids or semi-fluid matters through a pump equipped with check valves only, the pump will not perform satisfactorily for the reason that the presence of the heavy, viscous, difficult flowing material prevents the check valves from closing properly, with the result that the pump will deliver only a fraction of the material it is designed to pump.

My invention is designed to overcome the disadvantages experienced in pumping such materials. By providing a valve mechanically actuated in timed relation with the stroke of the piston, the pump is assured of delivering the quantity of material for which it is designed.

In accordance with my invention I provide a rotary, multiple-way valve, mechanically actuated to rotate quickly at each stroke of the plunger or piston. I provide a pivoted arm, which at one end engages the valve stem or shaft and at the other end, is provided with a cam surface which is adapted to be engaged by a roller on the crank arm which operates the pump piston. The cam surface is arranged in such relation to the roller on the crank arm that at almost the end of the discharge stroke of the plunger, the roller engages the cam surface to quickly turn the arm about its pivot. The arm in turn engages the valve stem, causing it to rotate to a position to provide a passageway from the source of supply of fluid to the interior of the cylinder in which the piston reciprocates. During the suction stroke of the plunger, the valve remains stationary, but when the plunger almost reaches the end of its suction stroke, the crank arm roller again engages the came surface of the rocker arm, causing it to turn on its pivot in the reverse direction and rotate the valve in the reverse direction until it connects the pump cylinder with the discharge outlet. Because of the fact that the crank arm operates the piston and the valve, the two operate in perfect synchronism.

One of the novel features of my device is the valve structure.

Another novel feature of my invention is the means for operating the valve.

Still another feature of the invention is the combination of pump, valve and actuating mechanism.

Other features of my invention will become apparent from the following detailed description considered in connection with the accompanying drawings, of which Fig. 1 is a diagrammatic elevational view showing the arrangement of the actuating means for the plunger and valve.

Fig. 2 is an enlarged, diagrammatic, elevational view of the rocker arm forming a part of the actuating mechanism.

Figure 3:
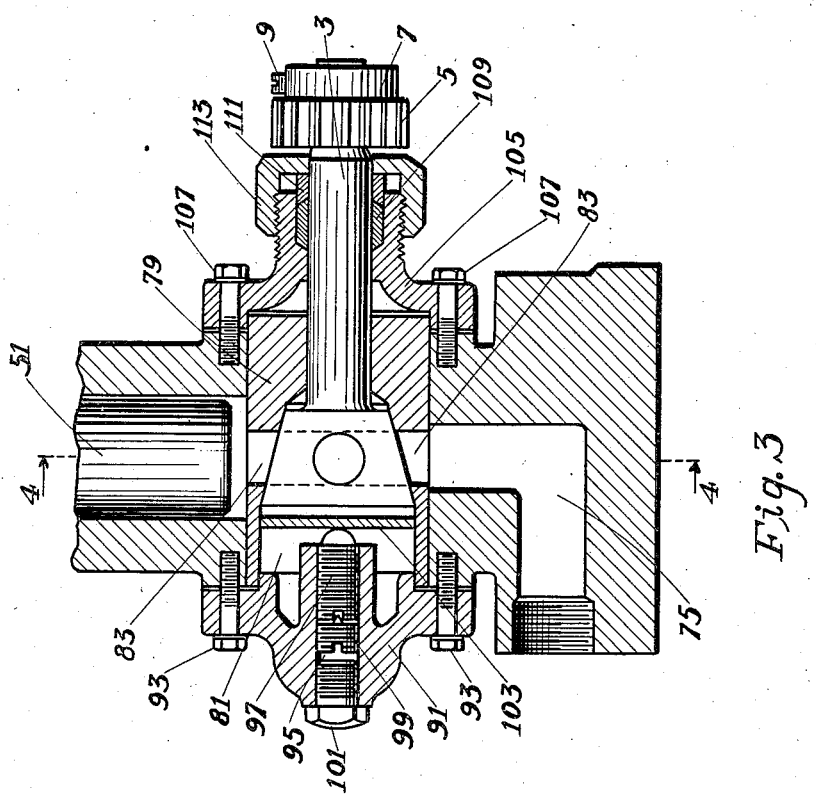
Fig. 3 is a fragmentary, elevational, cross-sectional view of a pump showing the valve structure.

Referring to Fig. 1, the numeral 1 indicates the body portion of a reciprocating type pump somewhat similar to that shown and described in the patent to C. O. Buenger, No. 1,858,185. The valve stem 3 projects through the side of the pump body near the base thereof and has a spur gear 5 rigidly mounted on the outer end thereby by means of the collar 7 and set screw 9 (Fig. 3). The collar 7 is formed integrally with the spur gear 5. Referring to Figures 1 and 2, rocker arm 11 is pivotally mounted on the pump body by means of the stud 13 which passes through a hole in the body and through the hole 15 in the rocker arm. The end 17 of the rocker arm 11 is shaped to conform to the arc of a circle having a radius equal to the distance from the center of the hole 15 to any point on the arc. The end 17 is also formed with teeth 19 adapted to be in permanent engagement with the teeth 21 of the spur gear. The length of the arcuate end 17 is sufficient to enable it to remain in engagement with the spur gear when the arm is rocked in either direction.

The opposite end of the rocker arm is formed into a large circular portion 23. The center part 25 of the circular portion 23 is cut out to form cam surface 27. The portions 29 and 31 may also be cut out of the circular portion to provide lightness and proper balance to the rocker arm. It will be evident that the rocker arm may be cast in the form shown in Fig. 2 and then machined.

A crank arm 33 is keyed to the crank shaft 35 by means of key 37. Power from any suitable source is applied to the crank arm through the crank shaft. The shaft is preferably positioned centrally of the cam surface 27. Adjacent one end of the crank arm is mounted the roller 39 by means of the stud 41. The roller is adapted to engage the cam surface 27 during certain portions of the rotation of the crank arm. One end of a connecting rod 43 is pivotally connected to the other end of the crank arm 33 by means of the pin 45. A second connecting rod 47 is pivotally connected at one end to the other end of rod 43 by means of the pin 49. The length of the rod 47 may be adjustable in order to adjust the length of the stroke of the plunger or piston 51.

The piston 51 is pivotally mounted on the rod 47 by means of the wrist pin 53. The rod 47 is pivotally connected, adjacent its other end, to one end of a swivel arm 55 by means of the pin 57. The other end of the swivel arm is pivotally supported at the top of the pump body by a pin 59 between the bifurcated arm 61.

Referring to Fig. 2, the cam surface between the points 63 and 65 is out of contact with the roller 39. This insures that the position of the valve 66 (Fig. 4) is not disturbed during the discharge stroke of the piston 51. From the point 65 to the point 67 the cam surface is of such configuration that the roller 39 is adapted to engage it immediately before completion of the discharge stroke of the piston. From the point 67 to the point 69 the cam surface is of such configuration that it is out of contact with the roller 39 in order to avoid disturbing the position of the valve during the suction stroke of the piston. Between the points 69 and 63 the cam surface is of such curvature that the roller 39 is adapted to engage just before the piston has completed its suction stroke. By providing the steep inwardly curved portion between the points 65 and 71, and between the points 69 and 73, it is possible for the rocker arm 11 to throw the valve from one position to another almost instantaneously at the time the piston 51 is at the bottom or top of its stroke, without causing excessive wear or jarring which would result if the curvature were not such as to permit the roller to gradually engage the cam surface.

As shown in Fig. 2, the cam surface is provided with the portions between the points 67 and 71 and between the points 63 and 73, along which the roller 39 may ride after the valve is thrown to the desired position. The surface recedes sufficiently at the points 67 and 63 to enable the roller to clear the cam surface from these points to the points 65 and 69. The portions 67—71 and 63—73 may be longer or shorter than shown, or may be entirely eliminated, that is, the cam surface may recede at the points 71 and 73 so that the roller clears the cam surface immediately after rocking the arm to the desired position.

It will be apparent that the shape of the cam surface 27 may be determined empirically or may be calculated for any particular pump.

Figure 4:
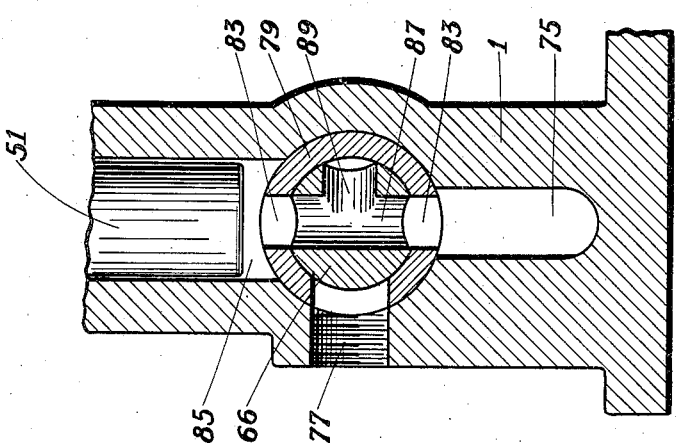
Fig. 4 is a fragmentary, elevational, cross-sectional view taken on the line 4—4 of Fig. 3, showing the valve in conjunction with the pump inlet and outlet.

Referring to Figures 3 and 4, the pump body has an inlet 75 and an outlet 77. A cylindrical horizontal hole is drilled through the lower portion of the pump body from one side to the other, and a valve seat or bushing 79 is press-fitted therein. The valve seat is in turn formed with a horizontal cylindrical bore 81 which at one end is of relatively large diameter and at the other end of relatively small diameter. The portion intermediate the ends is frusto-conical in shape. The valve seat also has a vertical passageway 83 connecting the inlet 75 and the pump cylinder 85, and a horizontal opening 86, at right angles to the passageway 83, for the purpose of providing a passageway from the pump cylinder 85 to the discharge outlet 77.

The valve 66 is preferably formed integrally with the stem 3 and is frusto-conical in shape, being adapted to fit snugly within the frustro-conical portion of the bore 81 and to rotate therein. The stem 3 passes through the smaller portion of the bore 81 and the bore forms a bearing surface in which the stem may rotate. The valve 66 has a passageway 87 therethrough intermediate the ends thereof and in alignment with the passageway 83 in the valve seat. A second passageway 89 is drilled through the valve preferably at ninety degrees to the passageway 87 and in the same vertical plane therewith. The passageway 89 is drilled from one side of the conical wall only to the passageway 87.

A cap 91 is adapted to fit over and close the front end of the horizontal hole drilled through the pump body. The cap is fastened to the pump body by means of bolts 93 which are adapted to screw into holes tapped in the pump body. A threaded hole 95 passes horizontally through the center of the cap and accommodates the adjusting screw 97, lock screw 99 and the cap screw 101. A circular plate or washer 103 is adapted to fit against the front face of the valve 66. The adjusting screw may be adjusted to press against the washer 103 which in turn forces the valves to fit snugly in the valve seat thereby preventing leakage. The friction created by the washer 103 prevents the valve from turning freely or in excess of the distance it is rotated by the rocker arm.

The stuffing box 105 is adapted to be fastened to the pump body over the rear end of the horizontal hole drilled therethrough, by means of the bolts 107 which screw into holes tapped into the pump body. The stuffing box has a passageway drilled centrally therethrough in order to accommodate the valve stem 3. The passage is counterbored adjacent the outer end of the stuffing box in order to accommodate the packing material 109 and the packing ring 111. The outer surface of the stuffing box is threaded adjacent the end thereof to receive the cap nut 113.

The pump operates in the following manner: The crank shaft 35 actuated from any suitable source of power causes the crank arm 33 to rotate in a counter-clockwise direction. When the roller 39 on the crank arm reaches the point 65 on the cam surface 27, the pump piston 51 has almost reached the end of its discharge stroke. As the roller continues around it pushes against the portion of the cam surface between the points 65 and 71 thereby causing the rocker arm 11 to rotate about the stud 13 in a counter-clockwise direction. The rocker arm in turn rotates the valve to the position shown in Fig. 4. In the apparatus shown, the parts are arranged to rotate the valve ninety degrees in a clockwise direction. Communication between the pump cylinder and the outlet is broken and communication between the pump cylinder and the inlet takes place at the instant the crank arm is passing dead center.

The valve now connects the pump cylinder with the inlet 75 and remains in this position during substantially the entire suction stroke of the piston. During this stroke the roller on the crank arm travels from the point 71 to the point 69 of the cam surface. At this point the roller again engages the cam surface causing the rocker arm to rotate in a clockwise direction and the valve to rotate in a counter-clockwise direction. The rotation of the valve begins when the pump piston is almost at the top of its suction stroke and ends when the piston has just begun its down stroke. The valve is rotated through ninety degrees so that the passageway 39 is in communication with the pump cylinder 85 and the passageway 87 is in communication with the outlet 77. The valve and actuating mechanism is so adjusted that complete communication between the pump cylinder and the inlet is broken and communication between the pump cylinder and outlet is established at the instant the crank is passing dead center. After the roller clears the point 73 the rotation of the valve stops and the discharge stroke takes place thereby completing the cycle.

It will be understood that the particular configuration of the cam surface may be varied without departing from the scope of the invention. The particular curvature shown has been found to be preferable for satisfactory performance without causing excessive wear of working parts.

It will also be understood that the valve actuating mechanism may be used in connection with reciprocating pumps other than the particular type shown and described.

What I claim is:

1. A mechanical valve comprising a valve seat with cylindrical walls, a rotary valve mounted in said seat, three openings in said seat arranged around the periphery thereof in spaced relation, passageways in said valve adapted to coincide with said openings, a stem extending from said valve, a gear mounted on said stem, a rocker arm pivotally mounted to operate said valve, one end of said rocker arm having teeth adapted to engage said gear and the other end having a cam surface, a cam mounted on a shaft, means to rotate said shaft and said cam, said cam being adapted to intermittently engage said cam surface and alternately rock said arm in clockwise and counter-clockwise direction.

2. Apparatus of the character described comprising a two-way rotary valve, means for mechanically rotating said valve intermittently in alternate clockwise and counter-clockwise direction comprising a pivotally mounted rocker arm adapted to engage said valve at one end, a cam surface on the other end of said arm, a cam mounted on a power operated shaft, said cam being adapted to engage said cam surface intermittently and rock said rocker arm.

3. Apparatus of the character described comprising a rotary valve, means for intermittently actuating said valve comprising a pivotally mounted rocker arm, one end of which is in operative engagement with said valve, and the other end of which is enlarged, with the enlarged portion having a cam surface formed centrally thereof, a cam adapted to rotate within the area bounded by the cam surface, the cam surface being of such curvature that the cam engages it for a relatively short distance at approximately every 180 degrees of rotation and alternately rocks the arm in clockwise and counter-clockwise direction.

4. A rotary valve structure comprising a bushing having a passageway therethrough, a portion of which is cylindrical and another portion of which is frustro-conical in shape, the latter portion being of greater diameter than the former, a valve adapted to fit in the frustro-conical portion of said passageway and rotate therein, said valve having a stem formed integrally therewith which is adapted to extend through the cylindrical portion of said passageway, a washer adapted to fit against the face of said valve of greater diameter, means for holding said washer against said valve comprising an adjusting screw, the inner end of which contacts the center portion of said washer, a plurality of spaced ports in said bushing opening into the frustro-conical section of said passageway, and a plurality of spaced interconnected ports in said valve adapted to be rotated into coincidence with the ports in said bushing.

5. Apparatus of the character described comprising a valve of frustro-conical configuration, a valve seat therefor having a bore at one end corresponding substantially to the greatest diameter of said valve and a bore at the opposite end of smaller diameter than the minimum diameter of said valve, a valve stem integrally formed with said valve extending from the end of smallest diameter of said valve, through said bore of smaller diameter, means to rotate said stem in clockwise and counter-clockwise directions, a plate adapted to fit into said bore of greatest diameter, flush against the face of said valve, a valve cap adapted to close the end of said valve seat which contains the bore of greatest diameter, said cap having a threaded passageway therethrough, an adjusting screw in said passageway adapted to press against said plate and hold the valve snugly in the valve seat.

HARRY J. ANDERSON.